(12) United States Patent
Rosenhouse et al.

(10) Patent No.: US 12,687,614 B2
(45) Date of Patent: Jul. 21, 2026

(54) SYSTEMS AND METHODS FOR REMOTELY TRACKING LIFE SIGNS WITH A MILLIMETER-WAVE RADAR

(71) Applicant: VAYYAR IMAGING LTD., Yehud (IL)

(72) Inventors: Tsachi Rosenhouse, Kiryat Ono (IL); Jumana Silbak, Haifa (IL); Tom Harel, Shefayim (IL); Keren Ben-Yehuda, Tel-Aviv (IL)

( * ) Notice: Subject to any disclaimer, the term of this patent is extended or adjusted under 35 U.S.C. 154(b) by 62 days.

(21) Appl. No.: 18/710,625

(22) PCT Filed: Nov. 17, 2022

(86) PCT No.: PCT/IB2022/061082
§ 371 (c)(1),
(2) Date: May 16, 2024

(87) PCT Pub. No.: WO2023/089519
PCT Pub. Date: May 25, 2023

(65) Prior Publication Data
US 2025/0004105 A1     Jan. 2, 2025

Related U.S. Application Data

(60) Provisional application No. 63/280,634, filed on Nov. 18, 2021.

(51) Int. Cl.
*G01S 7/41* (2006.01)
*G01S 13/56* (2006.01)

(52) U.S. Cl.
CPC .............. *G01S 7/415* (2013.01); *G01S 7/417* (2013.01); *G01S 13/56* (2013.01)

(58) Field of Classification Search
None
See application file for complete search history.

(56) References Cited

U.S. PATENT DOCUMENTS

| 2016/0377704 A1 | 12/2016 | Harash et al. |
| 2019/0038133 A1 | 2/2019 | Tran |

FOREIGN PATENT DOCUMENTS

WO     2021165873 A1     8/2021

*Primary Examiner* — Whitney Moore
(74) *Attorney, Agent, or Firm* — AlphaPatent Associates Ltd.; Daniel J. Swirsky

(57) ABSTRACT

Systems and methods for monitoring life signs in a subject a radar unit comprising generates raw data and a processor unit receives raw data and identifies oscillating signals in a series of frames of complex values representing radiation reflected from each voxel of a target region during a given time segment. A processor may collate a series of complex values for each voxel representing reflected radiation for the associated voxel in multiple frames and generate therefrom a real signal sample for each voxel. Neural networks may be used to select the voxel with the best waveform.

8 Claims, 8 Drawing Sheets

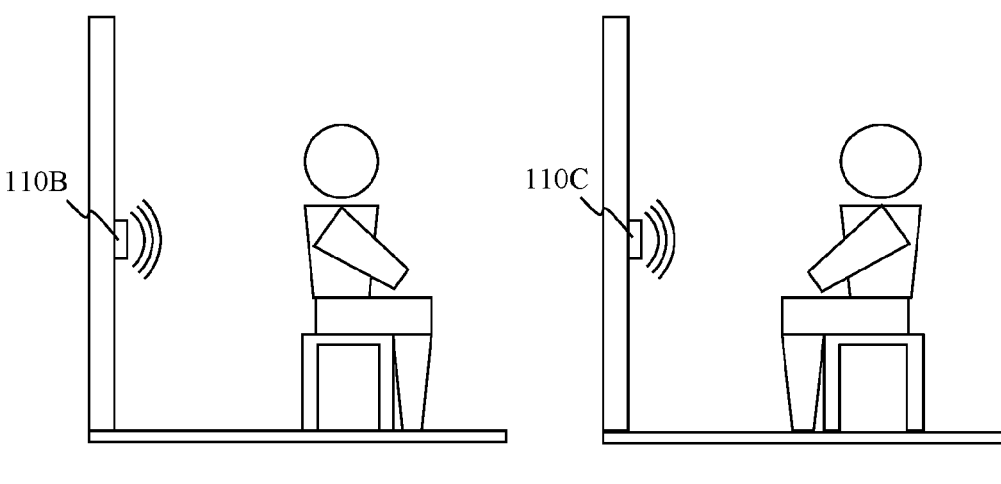
110B
Fig. 1B
110C
Fig. 1C
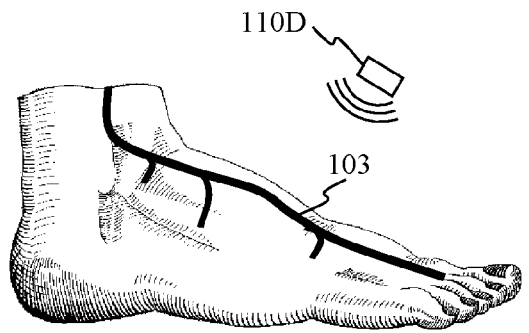
110D
103
Fig. 1D
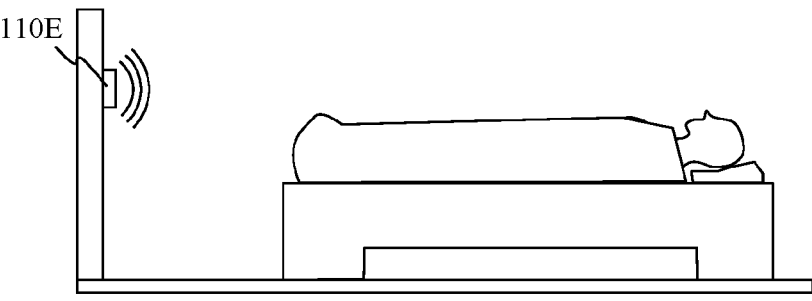
110E
Fig. 1E

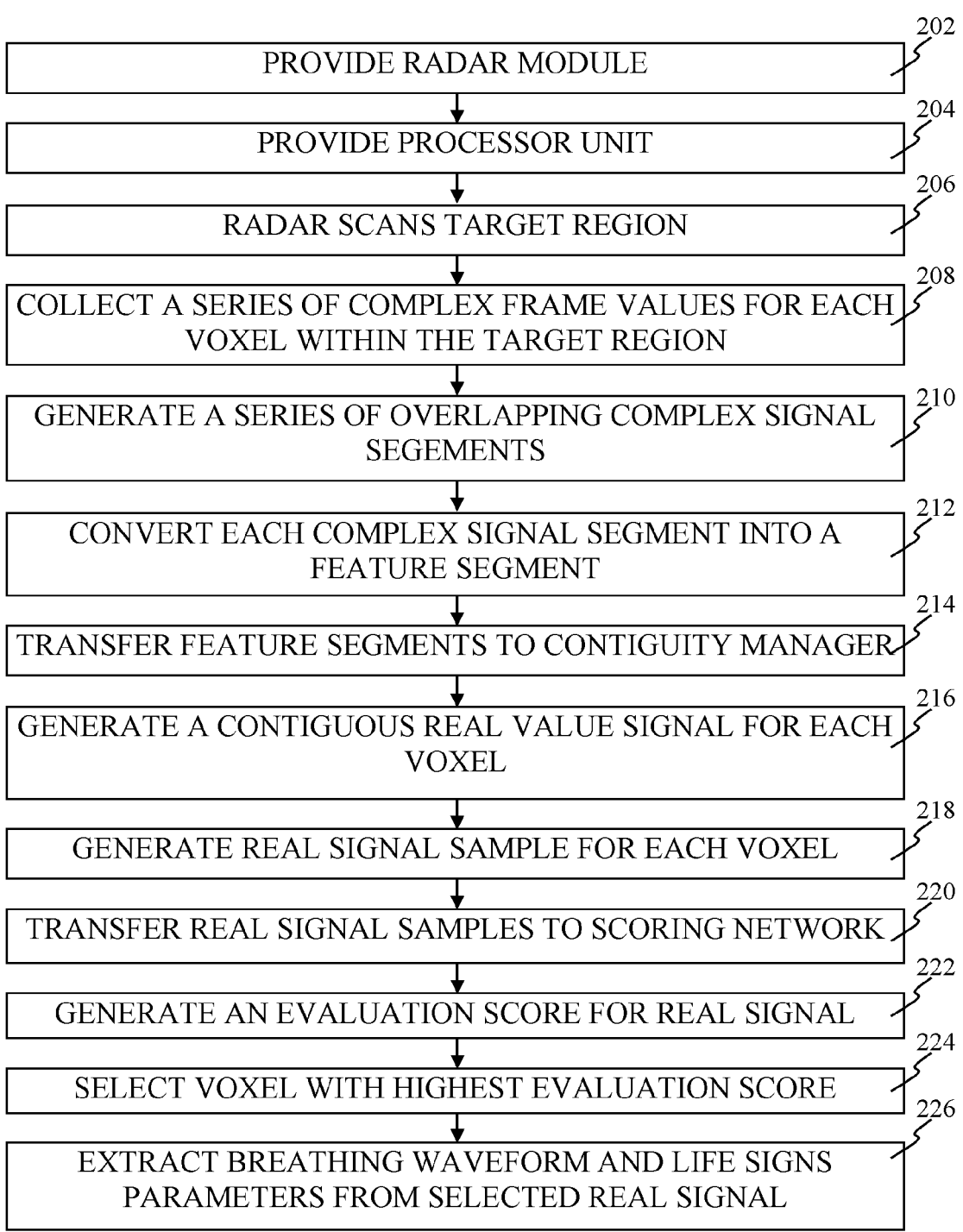

PROVIDE RADAR MODULE — 202

PROVIDE PROCESSOR UNIT — 204

RADAR SCANS TARGET REGION — 206

COLLECT A SERIES OF COMPLEX FRAME VALUES FOR EACH VOXEL WITHIN THE TARGET REGION — 208

GENERATE A SERIES OF OVERLAPPING COMPLEX SIGNAL SEGEMENTS — 210

CONVERT EACH COMPLEX SIGNAL SEGMENT INTO A FEATURE SEGMENT — 212

TRANSFER FEATURE SEGMENTS TO CONTIGUITY MANAGER — 214

GENERATE A CONTIGUOUS REAL VALUE SIGNAL FOR EACH VOXEL — 216

GENERATE REAL SIGNAL SAMPLE FOR EACH VOXEL — 218

TRANSFER REAL SIGNAL SAMPLES TO SCORING NETWORK — 220

GENERATE AN EVALUATION SCORE FOR REAL SIGNAL — 222

SELECT VOXEL WITH HIGHEST EVALUATION SCORE — 224

EXTRACT BREATHING WAVEFORM AND LIFE SIGNS PARAMETERS FROM SELECTED REAL SIGNAL — 226

Fig. 2A

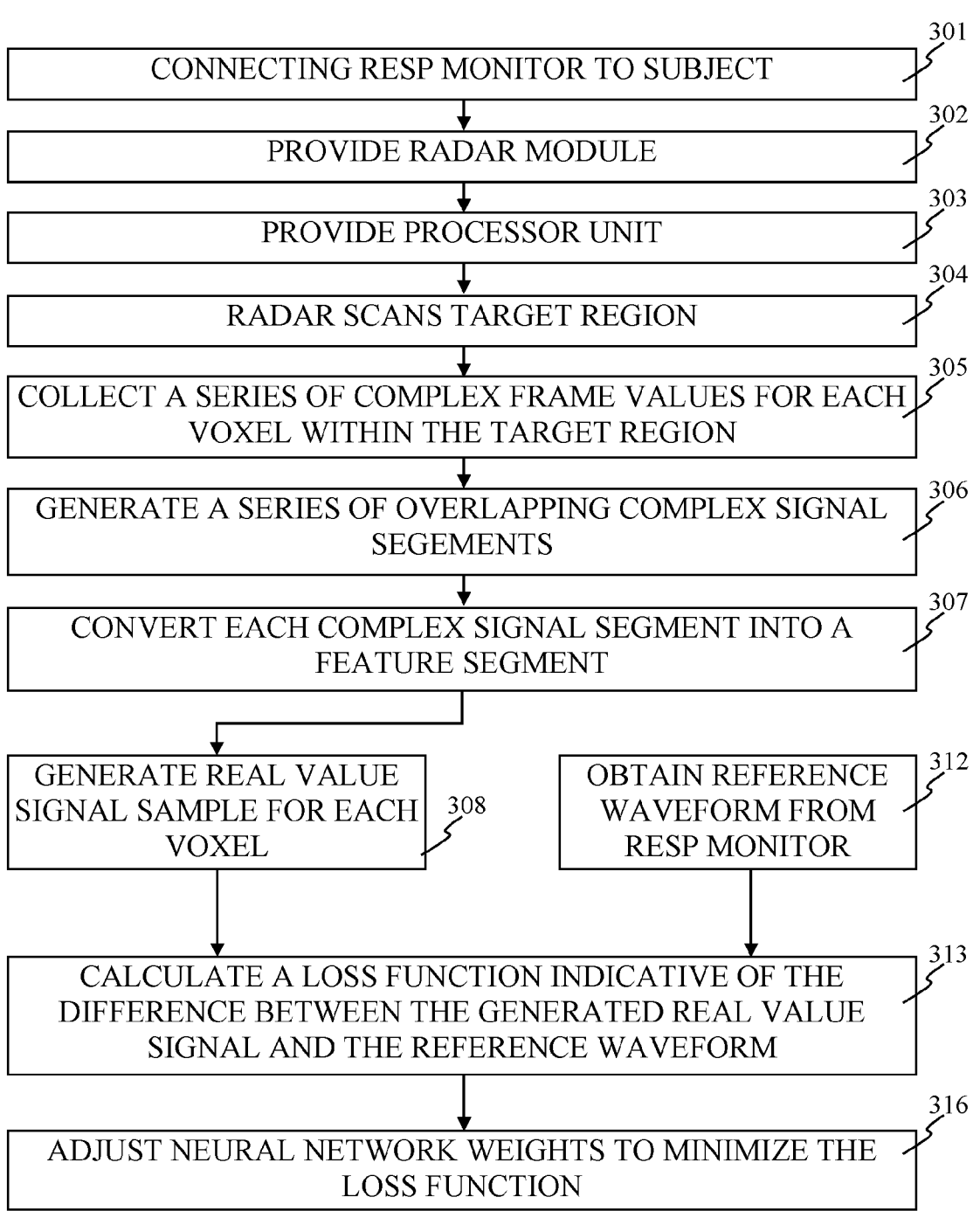

CONNECTING RESP MONITOR TO SUBJECT — 301

PROVIDE RADAR MODULE — 302

PROVIDE PROCESSOR UNIT — 303

RADAR SCANS TARGET REGION — 304

COLLECT A SERIES OF COMPLEX FRAME VALUES FOR EACH VOXEL WITHIN THE TARGET REGION — 305

GENERATE A SERIES OF OVERLAPPING COMPLEX SIGNAL SEGEMENTS — 306

CONVERT EACH COMPLEX SIGNAL SEGMENT INTO A FEATURE SEGMENT — 307

GENERATE REAL VALUE SIGNAL SAMPLE FOR EACH VOXEL — 308

OBTAIN REFERENCE WAVEFORM FROM RESP MONITOR — 312

CALCULATE A LOSS FUNCTION INDICATIVE OF THE DIFFERENCE BETWEEN THE GENERATED REAL VALUE SIGNAL AND THE REFERENCE WAVEFORM — 313

ADJUST NEURAL NETWORK WEIGHTS TO MINIMIZE THE LOSS FUNCTION — 316

Fig. 3A

SYSTEMS AND METHODS FOR REMOTELY TRACKING LIFE SIGNS WITH A MILLIMETER-WAVE RADAR

CROSS-REFERENCE TO RELATED APPLICATIONS

This application is a U.S. National Phase Application under 35 U.S.C. 371 of International Application No. PCT/IB2022/061082, which has an international filing date of November 17. 2022, and which claims the benefit of priority from U.S. Provisional Patent Application No. 62/280,634 filed on Nov. 18, 2021, the contents of which is incorporated by reference in their entirety.

FIELD OF THE DISCLOSURE

The disclosure herein relates to systems and methods for monitoring the life signs of individuals by using millimeter-wave radar. In particular the disclosure relates to systems and methods for tracking the displacement of body parts due to the breathing cycle and monitoring breathing characteristics, heart rate or pulse patterns.

BACKGROUND

A well-known method for detection of small displacement in narrowband radar systems exploits variation of the phase of the received signal over time. This method is often best carried out by first selecting voxels best suited for frequency determination.

Nevertheless, it is challenging to choose the best Voxels from which the breathing pattern is extracted, while being robust to other movements and noise. This disclosure deals with the selection of Voxels, extraction of waveform from the phase variation of the selected Voxels, and combining of the breathing waveform from multiple Voxels.

The need remains for efficient and reliable remote life signs monitoring. The invention described herein addresses the above-described needs.

SUMMARY OF THE EMBODIMENTS

According to one aspect of the presently disclosed subject matter, a method is taught for monitoring life signs in a subject within a target region, the method comprising training a waveform generation network to generate waveforms similar to a respiration monitor; providing a radar unit comprising at least one transmitter antenna connected to an oscillator, and at least one receiver antenna operable to generate raw data; providing a processor unit configured to receive raw data from the radar unit and operable to identify oscillating signals therein; the radar unit transmitting electromagnetic waves into the target region; the radar unit receiving electromagnetic waves reflected by objects within the target region; the radar generating a series of frames, each frame comprising an array of complex values representing radiation reflected from each voxel of the target region during a given time segment; for each voxel, the processor collating a series of complex values representing reflected radiation for the associated voxel in multiple frames; generating a real signal sample for each voxel; the waveform generation network generating an evaluation score for the real signal samples; selecting a voxel with highest evaluation score; and extracting life signs parameters from selected real signal.

According to another aspect, a method is hereby taught for monitoring life signs in a subject within a target region. The method may include providing a radar unit comprising at least one transmitter antenna connected to an oscillator, and at least one receiver antenna operable to generate raw data and providing a processor unit configured to receive raw data from the radar unit and operable to identify oscillating signals therein. The radar unit may transmit electromagnetic waves into the target region; and receive electromagnetic waves reflected by objects within the target region thereby generating a series of frames, each frame comprising an array of complex values representing radiation reflected from each voxel of the target region during a given time segment.

Accordingly, for each voxel, the method may further include the processor collating a series of complex values representing reflected radiation for the associated voxel in multiple frames; generating a series of overlapping complex signal segments; converting each complex signal segment into a feature segment; transferring feature segments to a contiguity manager; generating a contiguous real value signal for each voxel; generating a real signal sample for each voxel; transferring the real signal samples generated for each voxel to a scoring network; generating an evaluation score for the real signal samples; selecting a voxel with highest evaluation score; and extracting life signs parameters from selected real signal.

Variously, the step of generating the evaluation score for the real signal samples may include any or all of calculating a similarity score fore each voxel; evaluating a relative score for each voxel; extracting a set of features from each real signal; evaluating voxel feature scores; and combining multiple scores.

Regarding the step of generating a series of overlapping complex signal segments, this may comprise collecting continuous sequences of complex values for each voxel, each continuous sequences being collected from a continuous sequence of frames over a sequence-duration $\Delta t$. Further, a stagger-time $\delta t$ may elapse between sampling a first complex value for each complex signal segment and sampling the first complex value of a subsequent complex signal segments. Accordingly, the stagger-time $\delta t$ is typically less than the sequence-duration $\Delta t$.

Further aspects of the disclosure teach method for training a waveform generation network to generate waveforms similar to a respiration monitor. The method for training may include: providing the waveform generation network; providing a scoring network; connecting a test subject in a target region to a respiration monitor; obtaining a reference waveform from the respiration monitor; providing a radar unit comprising at least one transmitter antenna connected to an oscillator, and at least one receiver antenna operable to generate raw data; and providing a processor unit configured to receive raw data from the radar unit and operable to identify oscillating signals therein.

Accordingly the method for training may further include the radar unit transmitting electromagnetic waves into the target region; the radar unit receiving electromagnetic waves reflected by objects within the target region; the radar generating a series of frames, each frame comprising an array of complex values representing radiation reflected from each voxel of the target region during a given time segment; for each voxel, the waveform generation network generating a real signal sample; for each voxel, the waveform generation network generating a predicted waveform; for each voxel calculating a voxel error indicative of a difference between the predicted waveform and the reference waveform; for each voxel, providing the real signal sample to a scoring network; for each voxel, the scoring network generating a voxel evaluation score; generating a loss score for the scoring network; for each voxel, multiplying the voxel error to the voxel evaluation score thereby generating a voxel product; summing the voxel products of all voxels in the series of frames; and adjusting neural network weights of the scoring network to minimize the loss score.

Variously, the step of generating a loss score for the scoring network may comprise for each voxel, multiplying the voxel error to the voxel evaluation score thereby generating a voxel product; and summing the voxel products of all voxels in the series of frames. Optionally the absolute value or the square of the value of the voxel error may be multiplied to the voxel evaluation score such that the voxel product is always positive.

According to a further aspect, a system is introduced for monitoring life signs in a subject within a target region, the system comprising a radar unit comprising at least one transmitter antenna connected to an oscillator and configured to transmit electromagnetic waves into the target region, and at least one receiver antenna configured to receive electromagnetic waves reflected by objects within the target region and operable to generate raw data; a waveform generation network comprising a frame collector configured to receive raw data from the radar unit and operable to monitor life signs of subjects within the target region, a sampler, a segment analysis module, a contiguity manager and a fully connected layer; and a processor unit comprising a scoring network, a voxel selector and a life signs generator.

According to still another aspect, a system is introduced for training a waveform generation network to generate waveforms similar to a respiration monitor, the system comprising: a respiration monitor operable to generate a reference breathing waveform directly from a subject; a radar unit comprising at least one transmitter antenna connected to an oscillator and configured to transmit electromagnetic waves into the target region, and at least one receiver antenna configured to receive electromagnetic waves reflected by objects within the target region and operable to generate raw data; a monitor network configured and operable to generate real value signals and predicted waveforms from the raw data generated by the radar unit; a scoring network configured and operable to generate a voxel evaluation score; and a processor configured to receive the receive the reference breathing waveform from the respiration monitor and voxel predicted waveforms from the monitor network and operable to: generate a voxel error comparing the voxel predicted waveform with the reference breathing waveform; multiply the voxel error with the evaluation score for each voxel to produce a voxel product for each voxel; and sum the voxel products to produce a loss score; wherein the processor is further operable to adjust neural network parameters of the scoring network to minimize the loss score.

BRIEF DESCRIPTION OF THE FIGURES

For a better understanding of the embodiments and to show how it may be carried into effect, reference will now be made, purely by way of example, to the accompanying drawings.

With specific reference now to the drawings in detail, it is stressed that the particulars shown are by way of example and for purposes of illustrative discussion of selected embodiments only, and are presented in the cause of providing what is believed to be the most useful and readily understood description of the principles and conceptual aspects. In this regard, no attempt is made to show structural details in more detail than is necessary for a fundamental understanding; the description taken with the drawings making apparent to those skilled in the art how the various selected embodiments may be put into practice. In the accompanying drawings:

FIGS. 1B-E show various configurations of devices for directing radar waves towards a subject;

FIGS. 2A and 2B are flowcharts indicating a possible method for monitoring life signs in a subject;

FIG. 3A is a flowchart indicating a possible method for training a waveform generation network to generate waveforms;

DETAILED DESCRIPTION

Figure 1A:
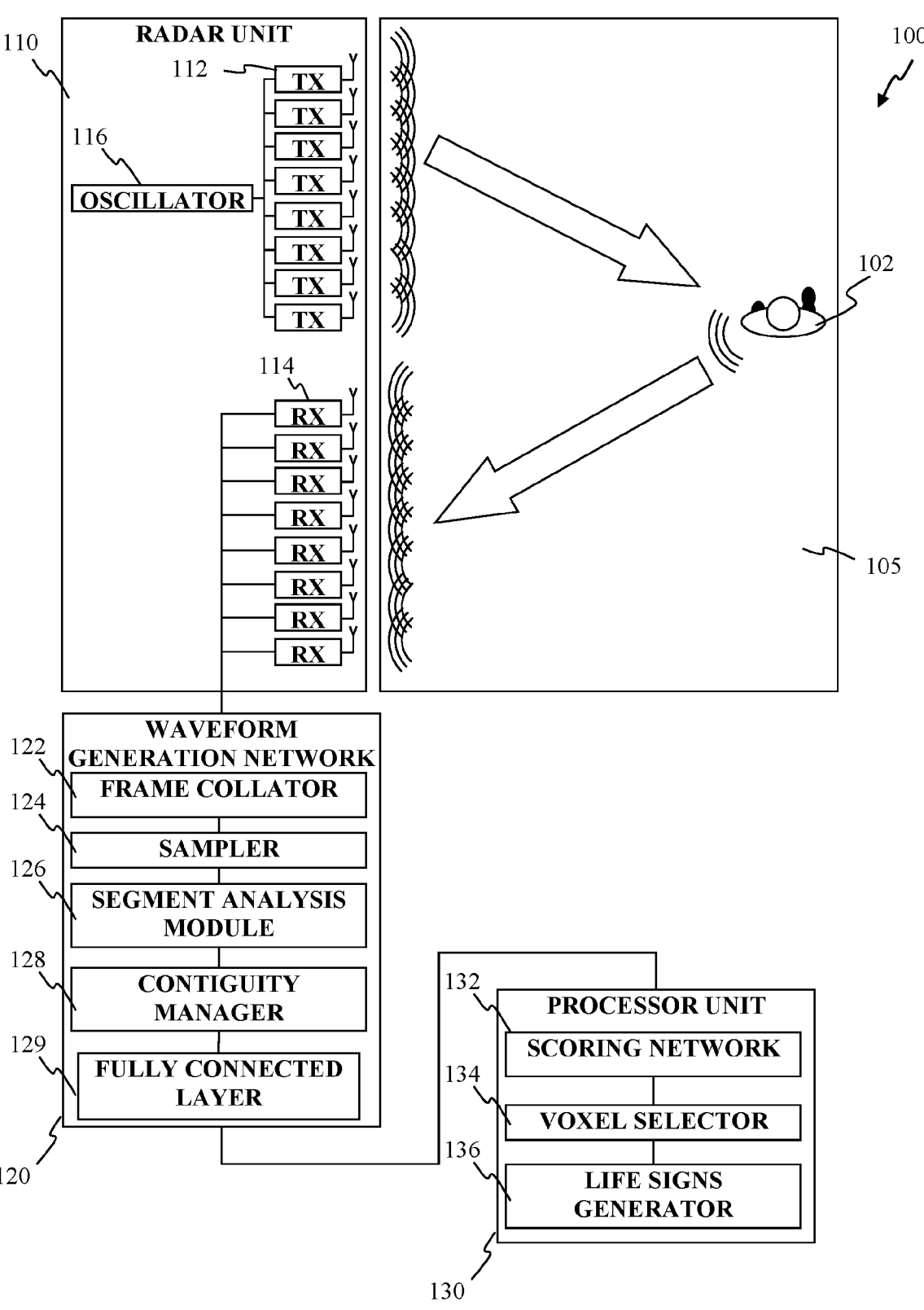
FIG. 1A is a schematic representation of a possible life signs monitor and communication system.

Aspects of the present disclosure relate to systems and methods for monitoring the life signs of individuals by using millimeter-wave radar. In particular, the disclosure relates to systems and methods for tracking the displacement of body parts due to the breathing cycle and monitoring breathing characteristics, heart rate or pulse patterns.

The radar may transmit and receive scanning radiation over the target region; the radar may generate a series of frames, each frame comprising an array of complex values representing radiation reflected from each voxel of the target region during a given time segment. Accordingly, the processor may collate a series of complex values for each voxel representing reflected radiation for the associated voxel in multiple frames.

Neural networks may be used to process this raw data to generate life sign parameters detected within the target region.

As required, detailed embodiments of the present invention are disclosed herein; however, it is to be understood that the disclosed embodiments are merely examples of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In various embodiments of the disclosure, one or more tasks as described herein may be performed by a data processor, such as a computing platform or distributed computing system for executing a plurality of instructions. Optionally, the data processor includes or accesses a volatile memory for storing instructions, data or the like. Additionally, or alternatively, the data processor may access a non-volatile storage, for example, a magnetic hard-disk, flash-drive, removable media or the like, for storing instructions and/or data.

It is particularly noted that the systems and methods of the disclosure herein may not be limited in its application to the details of construction and the arrangement of the components or methods set forth in the description or illustrated in the drawings and examples. The systems and methods of the disclosure may be capable of other embodiments, or of being practiced and carried out in various ways and technologies.

Alternative methods and materials similar or equivalent to those described herein may be used in the practice or testing of embodiments of the disclosure. Nevertheless, particular methods and materials are described herein for illustrative purposes only. The materials, methods, and examples are not intended to be necessarily limiting.

Reference is now made to FIG. 1A which is a schematic representation of a life signs monitor 100, in accordance with one embodiment of the invention. The life signs monitor may include a radar unit 110, a waveform generation network 120 and a processor 130.

The waveform generation network 120 may include a frame collator 122, a sampler 124, segment analysis module 126, a contiguity manager 128 and a fully connected layer 129 operable to generate a real signal sample of a required length for each voxel.

The real signal samples for each voxel may be transferred to the processor unit 130 which includes a scoring network 132 a voxel selector 134 and a life signs generator 136 operable to extract life signs data such as breathing waveform, breathing rate, pulse rate and the like.

The radar unit includes an array of transmitters 112 an array of receivers 114. An oscillator 116 may be connected to at least one transmitter antenna or an array of transmitter antennas. Accordingly the transmitters 112 may be configured to produce a beam of electromagnetic radiation, such as microwave radiation or the like, directed towards a monitored region 105 such as an enclosed room or the like. The receivers 114 may be operable to receive electromagnetic radiation reflected from a subject 102 within the monitored region 105.

It is noted that the subject 102 may variously be standing, sitting, reclining or walking within the monitored region. Where required, for example for sensitive heart rate determination, the subject 102 may sit with his or her back towards the device 110B so that the radiation is directed towards the subject's back, as shown in FIG. 1B. Alternatively, the subject may sit with his or her chest towards the device 110C so that the radiation is directed towards the subject's chest, as shown in FIG. 1C. As another alternative, the device 110D may be configured such that radiation may be directed towards the top of the subject's foot, as shown in FIG. 1D where it may receive strong reflections from the dorsal artery 103 for example.

In still other embodiments, as shown in FIG. 1E, the device 110E may be configured and operable to monitored an individual reclining on a bed, possibly during sleep.

The raw data generated by the receivers is typically a set of magnitude and phase measurements corresponding to the waves scattered back from the objects in front of the array. Spatial reconstruction processing is applied to the measurements to reconstruct the amplitude (scattering strength) and phase at the three dimensional coordinates of interest within the target region. Thus each three dimensional section of the volume within the target region may represented by a voxel defined by five values corresponding to an x-coordinate, a y-coordinate, a z-coordinate, an amplitude value, and a phase value.

Referring now to the block diagram of FIG. 2A which indicates selected actions of a method for monitoring life signs in a subject within a target region. The method includes providing a radar unit 202 such as described above. In particular, the radar unit may comprise at least one transmitter antenna connected to an oscillator and configured to transmit electromagnetic waves into the target region, and at least one receiver antenna configured to receive electromagnetic waves reflected by objects within the target region and operable to generate raw data. The method further includes providing a processor unit 204 which may be configured to receive raw data from the radar unit and operable to identify oscillating signals therein.

The radar may be used to scan the target region 206 by the transmitter antennas transmitting over the target region and the receiver antennas receiving scanning radiation reflected back. Thus, the radar may generate a series of frames, each frame comprising an array of complex values representing radiation reflected from each voxel of the target region during a given time segment.

Accordingly, the processor unit may generate a complex signal by collating a series of complex values for each voxel 208 representing reflected radiation for the associated voxel in multiple frames.

A sampler may be configured to generate a series of overlapping complex signal segments 210. Where appropriate, each complex signal segment may comprise a continuous sequence of complex values collected from a continuous sequence of frames of duration Δt.

Figure 2B:
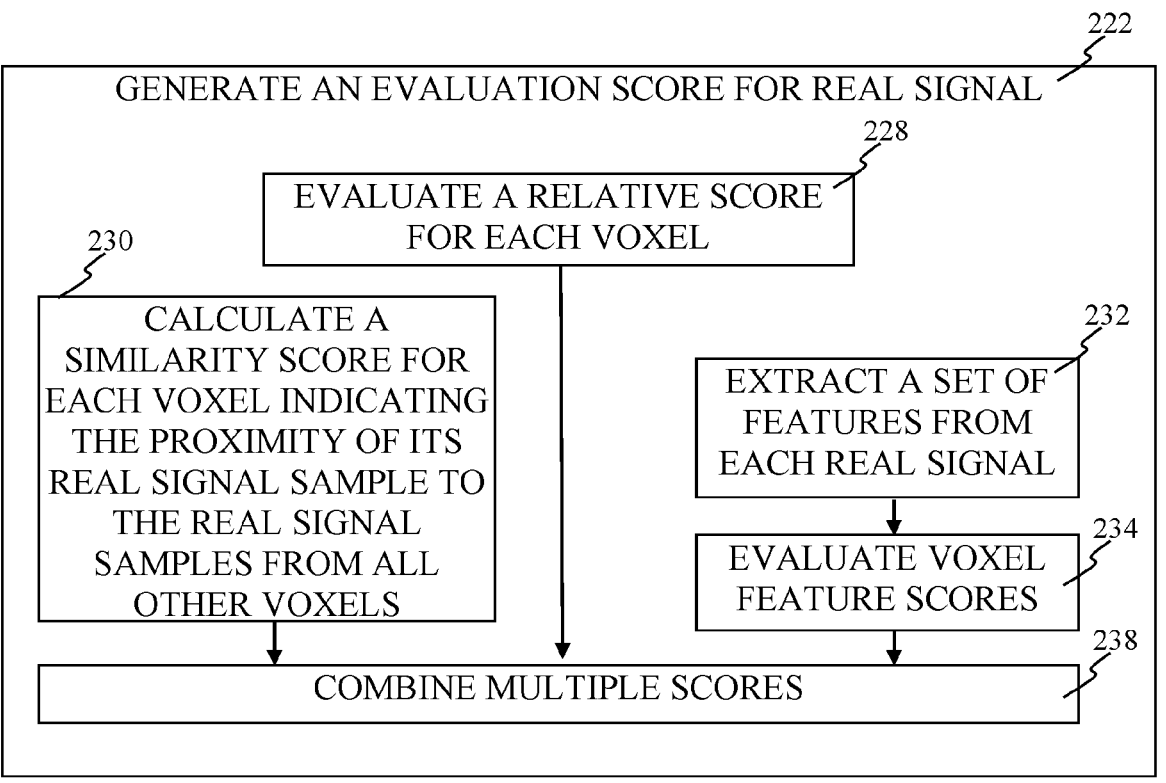
Figure 2C:
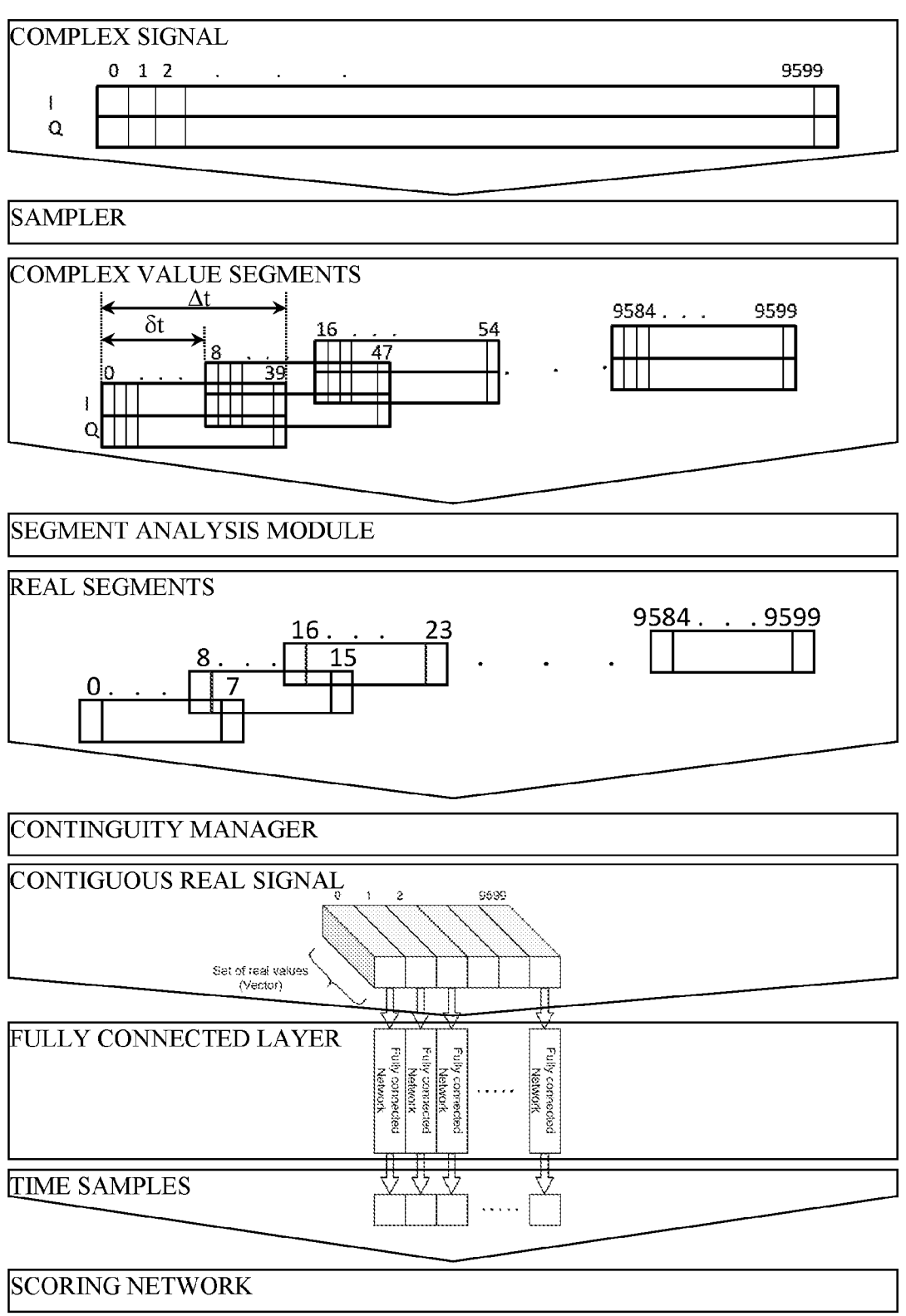
FIG. 2C illustrates a possible data flow through the preprocessor.

As illustrated in FIG. 2C, the first complex value of each signal segment may be collected from a frame captured at a stagger-time δt before the first complex value of the next signal segment, where the stagger-time δt is less than Δt.

A segment analysis module may be configured to receive the series of overlapping complex signal segments and to convert 212 each complex signal segment into a feature segment of length δt comprising a sequence of real values.

The feature segments may be transferred to a contiguity manager 214 to ensure that each segment is compatible with the next. Accordingly, the contiguity manager may receive the feature segments and generate a contiguous real value signal for the associated voxel 216.

A fully connected layer may be used to generate a real signal sample of a required length for each voxel 218.

The real signal samples may be transferred to a scoring network 220. Accordingly, the scoring network may generate an evaluation score 222 indicating proximity of the real signal sample to a life signs signal.

The voxel with the highest evaluation score may be thus selected 224 and breathing waveforms, life signs parameters and the like may be extracted from the real signal with the highest evaluation score 226.

There are various methods for generating an evaluation score for the real signal associated with each voxel. By way of illustration only FIG. 2B shows a possible method for generation the evaluation score 222.

The real signal samples generated for each voxel obtained for each voxel may be processed in parallel in multiple ways each generating a particular assessment score. For example, a neural network may evaluate a relative score for each real signal sample 228.

Additionally or alternatively, a set of features may be extracted from each real signal sample 232 and these features may be evaluated providing a feature score for the voxel 234.

Again, additionally, or alternatively, a similarity score may be calculated for each signal indicating the proximity of its real signal sample to the real signal samples obtained from other voxels 230.

Similarity score is a score that indicates how similar a signal that was generated to from a voxel to signals generated by other voxels is. As all signals which are similar to the true signal are typically also similar to each other, the similarity score may be indicative of the likelihood of a signal to be similar to the true signal.

Additionally or alternatively, the similarity score may be used instead of or in combination with the feature score that is obtained from the feature extraction neural network. However, in contrast to a neural network, there is no need for training here. Rather the value of the similarity score may be calculated directly by considering two signal segments of length T from two different voxels—$s_i$, $s_j$.

The correlation between them may be defined as follows:

$$c_{i,j} = \frac{1}{T} \sum_{0 \le t \le T} (s_i(t) - \text{mean}\{s_i\}) \cdot (s_j(t) - \text{mean}\{s_j\})$$

The following equation implies that voxels with high correlation share a similar score.

$$\begin{pmatrix} \text{score}_1 \\ \text{score}_2 \\ \vdots \\ \text{score}_n \end{pmatrix} = \frac{1}{\lambda} \cdot \begin{pmatrix} 0 & c_{1,2} & \cdots & c_{1,n} \\ c_{2,1} & 0 & \cdots & c_{2,n} \\ \vdots & \vdots & \ddots & \vdots \\ c_{n,1} & c_{n,2} & \cdots & 0 \end{pmatrix} \cdot \begin{pmatrix} \text{score}_1 \\ \text{score}_2 \\ \vdots \\ \text{score}_n \end{pmatrix}$$

Solving the above set of equations with largest value of $\lambda$ yields a score for each of the n voxels. This may be taken to be the similarity score.

Following the multiple evaluations of the voxel real signal samples, the various individual scores may be combined 238 to generate the overall evaluation score as required indicating the proximity of the real signal sample extracted from that voxel to a true signal.

With reference now to FIG. 2C, providing an illustrative example of the data flow through the preprocessor, the complex signal received from the radar module may comprise, for example, a 10 minute recording consisting of 9600 complex samples each having an in-phase component I and a quadrature component Q.

The sampler may be configured to generate a series of overlapping complex signal segments. For example, where a frame duration of $\Delta t=2.5$ seconds may be used such that 2.5 second segments are clipped from the complex signal by clipping 40 consecutive complex samples. The 2.5 second segments are staggered by a stagger-time $\delta t=0.5$ seconds, for example, by clipping samples 0-39, 8-47, 16-55, such that each segments starts a stagger-time $\delta t$ of 0.5 seconds after the previous segment.

The segment analysis module may comprise a convoluted neural network (CNN) or the like, configured to receive the series of overlapping complex signal segments. For each complex segment of length $\Delta t=2.5$ seconds the segment analysis module generates a corresponding real value feature segment of length $\delta t=0.5$ seconds consisting of 8 real values.

The contiguity manager may be a Long short-term memory (LSTM) artificial recurrent neural network (RNN) or the like. The contiguity manager is operable to receive all the real value segments and adapt them as required such that they are compatibly consistent for combining into a contiguous real signal. The contiguous real signal may thus consist of a series of up to 9600 real values or vectors.

It is noted that the contiguous real signal may be shorter than the original if the edges of the segments are clipped.

Nevertheless the generated signal corresponds to the input complex signal. Typically, the contiguous signal may include a set of values for each time steps such that the signal comprises a series of real value vectors.

A fully connected layer may be used to combine values of each vector per time step into a scalar value for transferring to the scoring network.

The scoring network is provided to generate an evaluation score indicating proximity of the real signal sample to a life signs signal. The evaluation score may be used to select which voxel of the target region provides the best fit to a life signs signal.

Optionally, the similarity score may be calculated or the voxel feature score may be generated by a neural network operating on features extracted from the real signal as described herein.

Referring now to the flowchart of FIG. 3A, selected steps are presented of a possible method for training a waveform generation network to generate waveforms similar to a real breathing waveform.

The method includes connecting a test subject 301 in a target region to a respiration monitor such as a respiration monitor belt for example, which is operable to directly measure the respiration of a test subject. Such a respiration monitor may be selected from standard examples known in the art.

The method further provides a radar unit 302 and provides a processor unit 303 configured to receive raw data from the radar unit and operable to identify oscillating signals therein.

The radar scans the target region 304 in which the subject is situated by transmitting and receiving scanning radiation over the target region. Accordingly, the radar generates series of frames 305, each frame comprising an array of complex values representing radiation reflected from each voxel of the target region during a given time segment.

Accordingly, the processor unit may generate a series of overlapping complex signal segments for each voxel within the target region 306. The complex signal segments are converted into corresponding real value feature segments 307 and these are combined into a real value signal for each voxel 308.

In parallel, a reference breathing waveform is obtained directly from the respiration monitor 312. Accordingly, a loss function indicative of the difference between the generated real value signal and the reference breathing waveform may be calculated 313. By way of example the loss function may be the root mean square error (RMSE) between the reference waveform and the generated signal. The weights of the waveform generation network may then be adjusted so as to minimize the LOSS function 316.

Figure 3B:
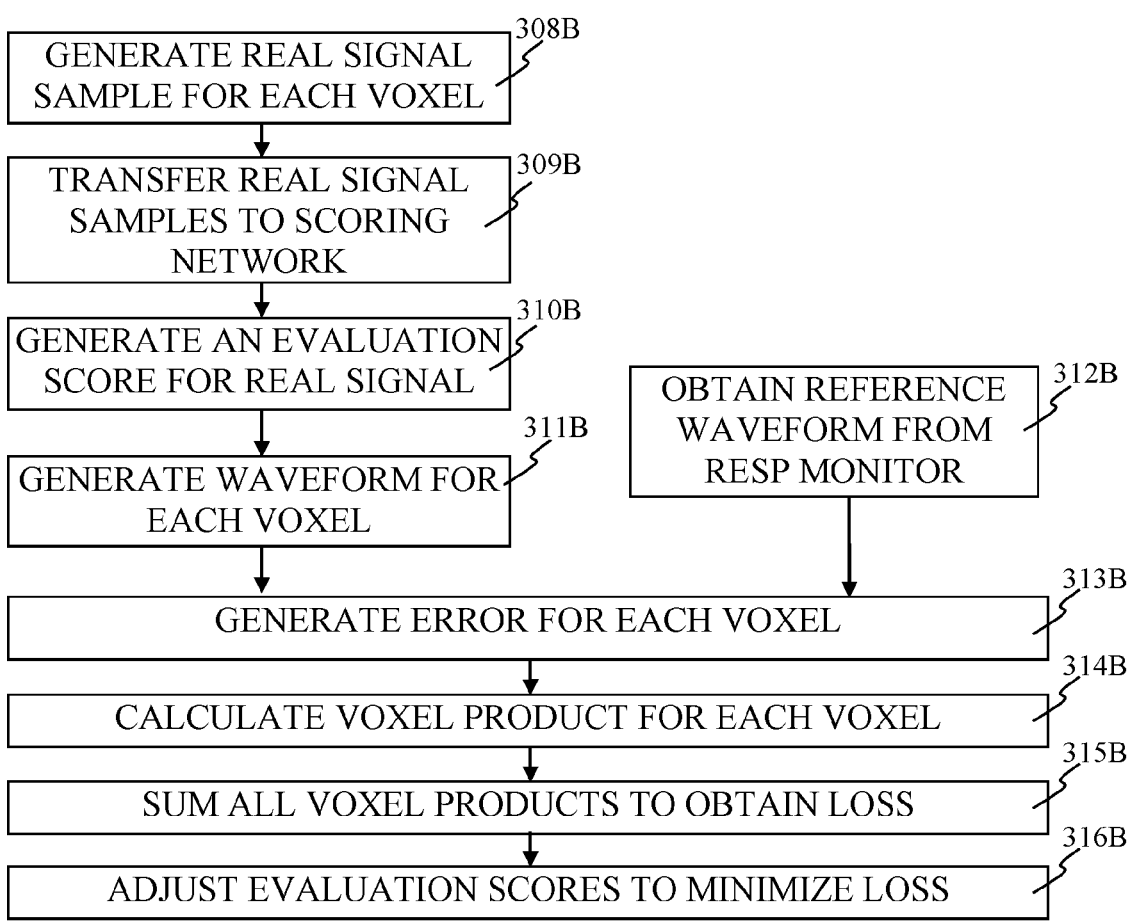
FIG. 3B is a flowchart indicating a possible method for training a scoring network to generate evaluation scores indicating proximity of a real signal sample to a life signs signal.

Referring now to the flowchart of FIG. 3B, selected steps are presented of a possible method for training a scoring network to generate evaluation scores indicating proximity of a real signal sample to a life signs signal.

A real value signal waveform is generated for each voxel in the target region 308B, the real value signals are transferred to the scoring network being trained 309B. The scoring network thus generates an evaluation score for each real value signal for each voxel 310B. The processor may further extract a candidate waveform parameters for each voxel 311B.

In parallel, a reference life signs signal is obtained directly from the respiration monitor 312B. Accordingly, a root mean square error (RMSE) may be calculated for each voxel 313B.

A characteristic voxel product is calculated by multiplying the RMSE with the evaluation score for each voxel 314B. The sum of all the voxel products is calculated to generate a LOSS score for the scoring network 315B. The scoring network may then be adjusted to generate evaluation scores so as to minimize the LOSS score 316B.

It is further noted that since there are two networks to be optimized with two loss functions, where required, the two networks may be optimized together to minimize a weighted sum of the two loss functions.

Figure 4:
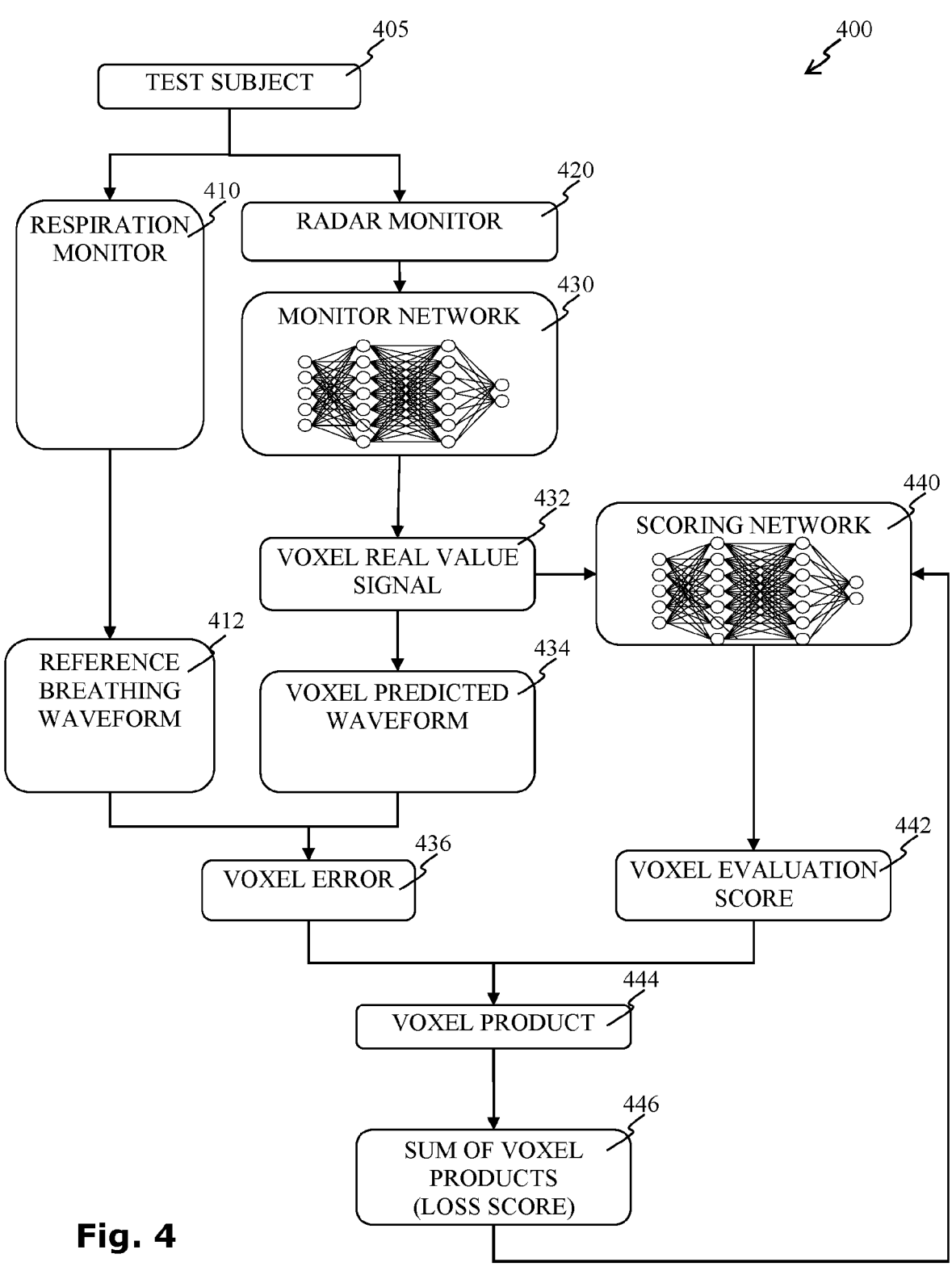
FIG. 4 schematically represents a system for training a scoring network to generate evaluation scores.

Referring now to the block diagram of FIG. 4, representing the main components of a training system 400 for a scoring network. Such a training system 400 is typically used during factory set up and if required may be unique to a specific system. The training system 400 includes a respiration monitor 410 and a radar monitor 420 both monitoring a common test subject 405. The respiration monitor 410 generates a reference breathing waveform 412 directly from the test subject.

The radar monitor 420 is connected to a monitor network 430 configured to generate a real value signal 432 such as described herein for each voxel in the monitored region. The real value signal 432 generated for each voxel is used to generate a predicted waveform 434.

Accordingly, a voxel error 436 may be calculated by comparing the voxel predicted waveform 434 with the reference breathing waveform 412.

In parallel, a scoring neural network 440 being trained receives the real value signal 432 generated for each voxel and calculates a voxel evaluation score 442 for each voxel. The voxel evaluation score 442 is multiplied with the voxel error 436 to generate a voxel product 444.

It is noted that if the voxel error 436 is high and the voxel evaluation score 442 is low then the voxel product 444 will be low. Accordingly, by training the scoring network 440 to minimize the sum 446 of the voxel products 444 the scoring network 440 will generate low evaluation scores 442 for high errors indicative of low similarity.

It is noted that a low similarity score may also be obtained in an unwanted case where all evaluations are zero such that the sum-product is minimized but no voxel has a higher evaluation than any other. It has been found that this unwanted case may be avoided by assigning the evaluations non-negative values and ensuring that the sum of evaluations is always a positive constant.

Accordingly, a loss score 446 may be fed back to the scoring network 440 which optimizes the neural network parameters so as to minimize the loss score 446, possibly using iterative techniques or heuristic techniques such as described above.

Technical Notes

Technical and scientific terms used herein should have the same meaning as commonly understood by one of ordinary skill in the art to which the disclosure pertains. Nevertheless, it is expected that during the life of a patent maturing from this application many relevant systems and methods will be developed. Accordingly, the scope of the terms such as computing unit, network, display, memory, server and the like are intended to include all such new technologies a priori.

As used herein the term "about" refers to at least ±10%.

The terms "comprises", "comprising", "includes", "including", "having" and their conjugates mean "including but not limited to" and indicate that the components listed are included, but not generally to the exclusion of other components. Such terms encompass the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" may include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween. It should be understood, therefore, that the description in range format is merely for convenience and brevity and should not be construed as an inflexible limitation on the scope of the disclosure. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6 as well as non-integral intermediate values. This applies regardless of the breadth of the range.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as neces- sarily limiting.

The scope of the disclosed subject matter is defined by the appended claims and includes both combinations and sub combinations of the various features described hereinabove as well as variations and modifications thereof, which would occur to persons skilled in the art upon reading the foregoing description.

The invention claimed is:

1. A method for monitoring life signs in a subject within a target region, the method comprising:

providing a radar unit comprising:

at least one transmitter antenna connected to an oscil- lator, and at least one receiver antenna operable to generate raw data;

providing a processor unit configured to receive raw data from the radar unit and operable to identify oscillating signals therein;

the radar unit transmitting electromagnetic waves into the target region;

the radar unit receiving electromagnetic waves reflected by objects within the target region; the radar generating a series of frames, each frame comprising an array of complex values representing radiation reflected from each voxel of the target region during a given time segment;

for each voxel, the processor collating a series of complex values representing reflected radiation for the associ- ated voxel in multiple frames;

generating a series of overlapping complex signal seg- ments;

converting each complex signal segment into a feature segment;

transferring feature segments to a contiguity manager;

generating a contiguous real value signal for each voxel;

generating a real signal sample for each voxel;

transferring the real signal samples generated for each voxel to a scoring network;

generating an evaluation score for the real signal samples;

selecting a voxel with highest evaluation score; and extracting life signs parameters from selected real signal.

2. The method of claim 1 wherein the step of generating the evaluation score for the real signal samples comprises calculating a similarity score fore each voxel.

3. The method of claim 1 wherein the step of generating the evaluation score for the real signal samples comprises evaluating a relative score for each voxel.

4. The method of claim 1 wherein the step of generating the evaluation score for the real signal samples comprises: extracting a set of features from each real signal; and evaluating voxel feature scores.

5. The method of claim 1 wherein the step of generating the evaluation score for the real signal samples comprises:

calculating a similarity score fore each voxel;

evaluating a relative score for each voxel;

extracting a set of features from each real signal;

evaluating voxel feature scores; and combining multiple scores.

6. The method of claim 1 wherein the step of generating a series of overlapping complex signal segments comprises collecting continuous sequences of complex values for each voxel, each continuous sequences being collected from a continuous sequence of frames over a sequence-duration $\Delta t$.

7. The method of claim 6 wherein a stagger-time $\delta t$ elapses between sampling a first complex value for each complex signal segment and sampling the first complex value of a subsequent complex signal segments.

8. The method of claim 7 wherein the stagger-time $\delta t$ is less than the sequence-duration $\Delta t$.

\* \* \* \* \*